(12) United States Patent
Castello et al.

(10) Patent No.: US 11,097,809 B2
(45) Date of Patent: Aug. 24, 2021

(54) METHODS FOR CONSTRUCTING HULLS FOR OFFSHORE STRUCTURES

(71) Applicant: HORTON DO BRASIL TECNOLOGIA OFFSHORE, LTDA., Rio de Janeiro (BR)

(72) Inventors: Xavier Castello, Rio Grande (BR); Marcelo I. L. Souza, Rio de Janeiro (BR); Rodrigo M. R. Guimarães, Rio de Janeiro (BR); Luiz Germano Bodanese, Rio de Janeiro (BR); Rafael Bodanese, Macaé (BR)

(73) Assignee: HORTON DO BRASIL TECNOLOGIA OFFSHORE LTDA., Rio de Janeiro (BR)

( * ) Notice: Subject to any disclaimer, the term of this patent is extended or adjusted under 35 U.S.C. 154(b) by 0 days.

(21) Appl. No.: 16/626,223

(22) PCT Filed: Jun. 26, 2018

(86) PCT No.: PCT/BR2018/050211
§ 371 (c)(1),
(2) Date: Dec. 23, 2019

(87) PCT Pub. No.: WO2019/000066
PCT Pub. Date: Jan. 3, 2019

(65) Prior Publication Data
US 2020/0115007 A1 Apr. 16, 2020

Related U.S. Application Data

(60) Provisional application No. 62/525,553, filed on Jun. 27, 2017.

(51) Int. Cl.
*B63B 3/06* (2006.01)
*B63B 3/56* (2006.01)
(Continued)

(52) U.S. Cl.
CPC .................. *B63B 3/06* (2013.01); *B63B 3/56* (2013.01); *B63B 35/44* (2013.01); *B23K 2101/06* (2018.08); *B63B 2001/126* (2013.01)

(58) Field of Classification Search
CPC .. B63B 3/06; B63B 3/56; B63B 35/44; B63B 2001/126; B23K 2101/06
See application file for complete search history.

(56) References Cited

U.S. PATENT DOCUMENTS 3,490,406 A * 1/1970 O'Reilly ............. B63B 35/4413
114/265
3,668,876 A * 6/1972 Koehler ............... E02B 17/0004
405/227
(Continued)

FOREIGN PATENT DOCUMENTS

JP    2007313523 A  * 12/2007  ............. B63B 71/00
JP    2007313523 A    12/2007
(Continued)

OTHER PUBLICATIONS

PCT/BR2018/050211 International Search Report and Written Opinion dated Nov. 30, 2018 (23 p.).
(Continued)

*Primary Examiner* — S. Joseph Morano
*Assistant Examiner* — Jovon E Hayes
(74) *Attorney, Agent, or Firm* — Conley Rose, P.C.

(57) ABSTRACT

A method for constructing a hull of an offshore structure includes (a) welding a plurality of plates together to form a plate assembly. The method also includes (b) passing the plate assembly through a rolling machine with the plate assembly in a vertical orientation. In addition, the method includes (c) bending the plate assembly into a cylinder during (b). The cylinder includes a pair of circumferentially adjacent free ends. Further, the method includes (d) welding the free ends of the cylinder together after (c) to form a cylindrical external wall.

20 Claims, 10 Drawing Sheets

(51) Int. Cl.
 *B63B 35/44* (2006.01)
 *B23K 101/06* (2006.01)
 *B63B 1/12* (2006.01)

(56) References Cited

U.S. PATENT DOCUMENTS

| | | | | |
|---|---|---|---|---|
| 4,685,409 | A * | 8/1987 | Liden | B63B 11/04 |
| | | | | 114/74 R |
| 6,266,862 | B1 * | 7/2001 | Oostwouder | B21C 37/122 |
| | | | | 29/281.4 |
| 6,575,665 | B2 * | 6/2003 | Richter | B63B 3/04 |
| | | | | 114/125 |
| 2003/0165361 | A1 | 9/2003 | Richter et al. | |
| 2020/0115007 | A1 * | 4/2020 | Castello | B63B 35/44 |

FOREIGN PATENT DOCUMENTS

| | | | | |
|---|---|---|---|---|
| KR | 20130001927 U | * | 3/2013 | |
| KR | 20130001927 U | | 3/2013 | |
| WO | WO-2019000066 A1 | * | 1/2019 | B63B 71/00 |

OTHER PUBLICATIONS

PCT/BR2018/050211 Article 19 Amendments filed Jan. 29, 2019 (9 p.).

* cited by examiner

METHODS FOR CONSTRUCTING HULLS FOR OFFSHORE STRUCTURES

CROSS-REFERENCE TO RELATED APPLICATIONS

This application is a 35 U.S.C. § 371 national stage application of PCT/BR2018/050211 filed Jun. 26, 2018, and entitled "Methods for Constructing Hulls for Offshore Structures," which claims priority to and the benefit of U.S. provisional patent application Ser. No. 62/525,553, filed Jun. 27, 2017, and entitled, "Methods for Constructing Hulls for Offshore Structures," the contents of each of which is incorporated herein by reference in its entirety for all purposes.

STATEMENT REGARDING FEDERALLY SPONSORED RESEARCH OR DEVELOPMENT

Not applicable.

BACKGROUND

Field of the Disclosure

The disclosure relates generally to the construction of floating offshore structures and bottom-founded offshore structures. More particularly, the disclosure relates to efficient methods for constructing cells, which are used to build columns and pontoons for offshore structures.

Background to the Disclosure

In oilfield activities, floating offshore structures and bottom-founded offshore structures are deployed and used to perform various offshore operations including drilling and production operations. Most conventional floating offshore platforms include a buoyant hull that supports a work deck above the surface of the water. The hull usually includes one or more buoyant columns comprised of cells varying in length and diameter.

SUMMARY

Some embodiments disclosed herein are directed to a method for constructing a hull of an offshore structure. In an embodiment the method includes (a) welding a plurality of plates together to form a plate assembly. In addition, the method includes (b) passing the plate assembly through a rolling machine with the plate assembly in a vertical orientation, and (c) bending the plate assembly into a cylinder during (b). The cylinder includes a pair of circumferentially adjacent free ends. Further, the method includes (d) welding the free ends of the cylinder together after (c) to form a cylindrical external wall.

In other embodiments disclosed herein, the method includes (a) passing a plate through a rolling machine. The plate includes a pair of opposing planar sides and the plate is passed through the rolling machine in a vertical orientation such that the opposing planar sides extend substantially vertically. In addition, the method includes (b) engaging the plate with a plurality of rollers in the rolling machine wherein each of the plurality of rollers extend in a vertical direction, (c) bending the plate into a cylinder during (b), wherein the cylinder includes a pair of circumferentially adjacent free ends, and (d) welding the free ends of the cylinder together after (c) to form a cylindrical external wall. Further, the method includes (e) attaching a plurality of ring reinforcements to an inner surface of the cylindrical external wall to form a shell section.

In still other embodiments disclosed herein, the method includes (a) passing a plate through a rolling machine. The plate comprises a pair of opposing planar sides, and the plate is passed through the rolling machine in a vertical orientation such that the opposing planar sides extend substantially vertically. In addition, the method includes (b) engaging the plate with a plurality of rollers during in the rolling machine during (a). Each of the plurality of rollers extend in a vertical direction. Further, the method includes (c) bending the plate into a cylinder during (b), wherein the cylinder includes a pair of circumferentially adjacent free ends, and (d) welding the free ends of the cylinder together after (c) to form a cylindrical external wall. Still further, the method includes (e) attaching a plurality of ring reinforcements, each including a radially inner flange and a radially outer annular web, to an inner surface of the cylindrical external wall to form a shell section after (d) by welding the annular web of each of the plurality of ring reinforcements to the inner surface of the cylindrical wall. Also, the method includes (f) repeating (a)-(e) to form a plurality of shell sections, (g) stacking the plurality of shell sections to form a cell after (f), and (h) attaching a first bulkhead to the cell after (g). Also, the method includes (i) repeating steps (a)-(h) to form a plurality of cells; and (j) forming a hull with the plurality of cells after (j).

BRIEF DESCRIPTION OF THE DRAWINGS

For a detailed description of the disclosed exemplary embodiments, reference will now be made to the accompanying drawings, wherein.

NOTATION AND NOMENCLATURE

The following description is exemplary of certain embodiments of the disclosure. One of ordinary skill in the art will understand that the following description has broad application, and the discussion of any embodiment is meant to be exemplary of that embodiment, and is not intended to suggest in any way that the scope of the disclosure, including the claims, is limited to that embodiment.

The figures are not necessarily drawn to-scale. Certain features and components disclosed herein may be shown exaggerated in scale or in somewhat schematic form, and some details of conventional elements may not be shown in the interest of clarity and conciseness. In some of the figures, in order to improve clarity and conciseness, one or more components or aspects of a component may be omitted or may not have reference numerals identifying the features or components. In addition, within the specification, including the drawings, like or identical reference numerals may be used to identify common or similar elements.

As used herein, including in the claims, the terms "including" and "comprising," as well as derivations of these, are used in an open-ended fashion, and thus are to be interpreted to mean "including, but not limited to . . . ." Also, the term "couple" or "couples" means either an indirect or direct connection. Thus, if a first component couples or is coupled to a second component, the connection between the components may be through a direct engagement of the two components, or through an indirect connection that is accomplished via other intermediate components, devices and/or connections. The recitation "based on" means "based at least in part on." Therefore, if X is based on Y, then X may be based on Y and on any number of other factors. The word "or" is used in an inclusive manner. For example, "A or B" means any of the following: "A" alone, "B" alone, or both "A" and "B." In addition, the terms "axial" and "axially" generally mean along a given axis, while the terms "radial" and "radially" generally mean perpendicular to the axis. For instance, an axial distance refers to a distance measured along or parallel to a given axis, and a radial distance means a distance measured perpendicular to the axis. As understood in the art, the use of the terms "parallel" and "perpendicular" may refer to precise or idealized conditions as well as to conditions in which the members may be generally parallel or generally perpendicular, respectively. Furthermore, any reference to a relative direction or relative position is made for purpose of clarity, with examples including "top," "bottom," "up," "upward," "down," "lower," "clockwise," "left," "leftward," "right," "right-hand," "down", and "lower." For example, a relative direction or a relative position of an object or feature may pertain to the orientation as shown in a figure or as described. If the object or feature were viewed from another orientation or were implemented in another orientation, it may be appropriate to describe the direction or position using an alternate term.

The use of ordinal numbers (i.e. first, second, third, etc.) to identify one or more components within a possible group of multiple similar components is done for convenience and clarity. The ordinal numbers used in the Detailed Description for members of a particular group of components may not necessarily correspond to the ordinal numbers used in the claims when referring to various members of the same group or a similar group of components.

DETAILED DESCRIPTION

As previously described above, floating offshore structures including a buoyant hull supporting a work desk are employed in offshore drilling and production operations. In many instances, the buoyant hull includes one or more buoyant cylindrical columns that are made up of a number of cylindrical cells coupled end to end.

Typically, the columns are built in a non-automated manner by separately manufacturing a variety of parts that are then assembled and integrated. Specifically, the outer walls of each cell are formed by bending individual steel plates on a horizontal axis rolling machine. Depending on the number of plates required to achieve the final cell diameter, this step may need to be repeated a number of times. Next, the individually bent plates are transitioned to a vertical orientation, and the sides of the bent plates are welded together to form a full circular, cylindrical wall. This technique of construction has very low precision relative to a desired out-of-roundness tolerance, which refers to a measure or estimation of the deviation a curved shape (e.g., a cylindrical cell in this case) has from a mathematically perfect circle (this tolerance may be more simply referred to herein as the "roundness" or "roundness tolerance"). In some embodiments, the out-of-roundness tolerance for a given cylindrical cell may be quantified as the difference between the maximum and minimum values of the cell diameter (e.g., inner diameter, outer diameter, etc.).

During the conventional manufacturing process described above, when the bent plates are placed in a vertical orientation (e.g., so that they may be interconnected to form a cylindrical wall), gravity imparts distortions on the relatively large heavy plates and thereby increases the final cylindrical cell's "out-of-roundness" tolerance. Consequently, additional work is performed after fabrication of the full circular cylindrical wall to impart the desired bend radius and bring the overall assembly into a desired out-of-roundness tolerance (e.g., to facilitate later coupling of multiple cells to form a buoyant column). Otherwise, the final product quality may be compromised.

Accordingly, embodiments described herein are directed to systems and methods for overcoming these manufacturing shortcomings and enhancing the overall construction efficiency when manufacturing buoyant columns for a floating offshore structure. In particular, embodiments disclosed herein offer the potential to impart the desired, final bend radius to the cylindrical wall in a single rolling step, such that the out-of-roundness tolerance challenges described above may be overcome.

Figure 1:
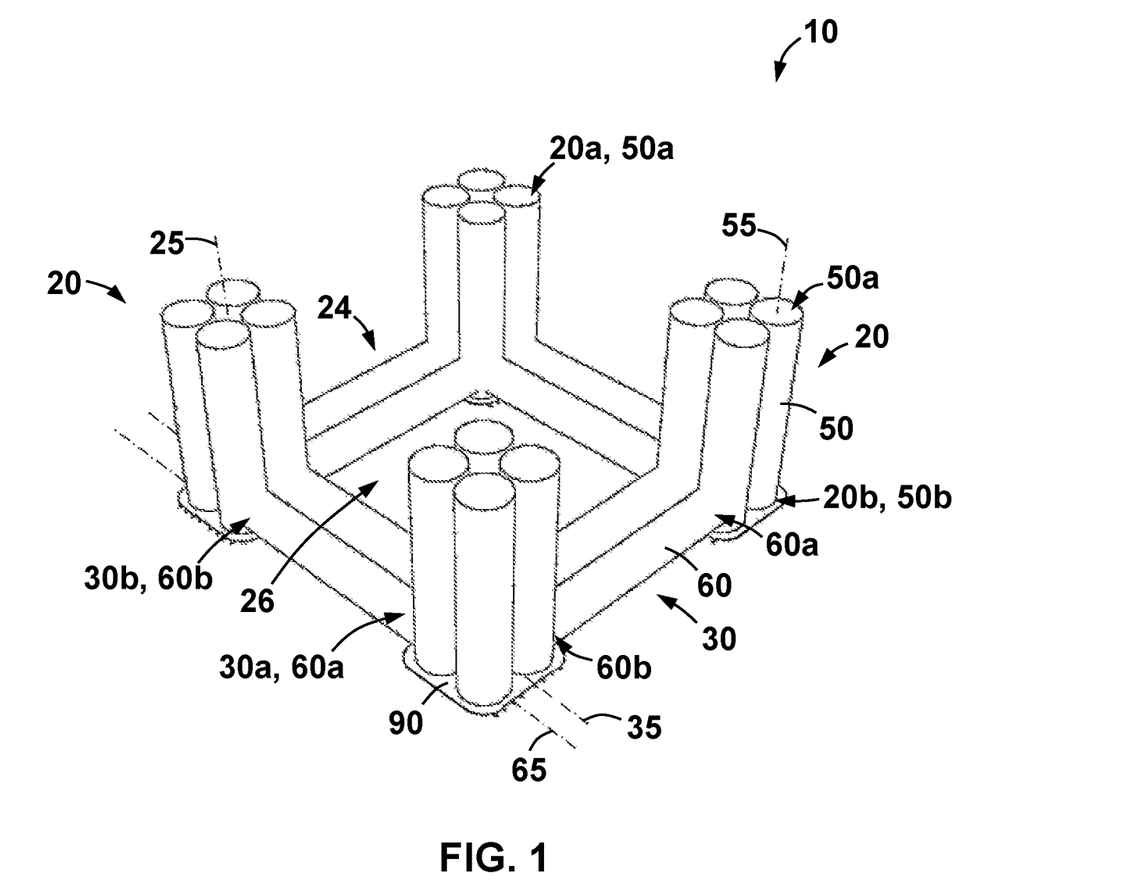
FIG. 1 is a perspective view of an embodiment of a buoyant hull for a semi-submersible offshore platform in accordance with the principles described herein.

Referring now to FIG. 1, an embodiment of a hull 10 for a semi-submersible floating offshore structure is illustrated. A work deck (not shown) is mounted atop hull 10 and is supported by hull 10 above the surface of the water when deployed offshore. Hull 10 includes a plurality of adjustably buoyant parallel vertical columns 20 and a plurality of adjustably buoyant horizontal pontoons 30. Columns 20 extend upward from pontoons 30. In particular, each pontoon 30 extends between the lower ends of each pair of adjacent columns 20, thereby forming a closed loop base 24 with four corners and a central opening 22. Although base 24 has a square geometry in this embodiment, with each pontoon 30 having the same length, in other embodiments, base 24 can have a different geometric shape such as rectangular, triangular, etc.

Each column 20 has a central or longitudinal axis 25, a first or upper end 20a, and a second or lower end 20b. As previously described, pontoons 30 extend horizontally between lower ends 20b of each pair of circumferentially adjacent columns 20. Columns 20 are vertically oriented, and thus, axes 25 are vertically oriented and extend parallel to one another. A plate or deck 90 is attached to the lower end 20b of each column 20. Decks 90 all generally lie in a common horizontal plane.

Each pontoon 30 has a central or longitudinal axis 35, a first end 30a fixably connected to the lower end 20b of one column 20, and a second end 30b fixably connected to the lower end 20b of another column 20. Pontoons 30 are horizontally oriented, and thus, axes 35 are horizontally oriented. In addition, each axis 35 intersects and is perpendicular to the two circumferentially adjacent axes 35.

Referring still to FIG. 1, in this embodiment, each column 20 includes a plurality of laterally adjacent tubular cylindrical sub-columns 50. Each sub-column 50 has a central or longitudinal axis 55, a first end 50a, and a second end 50b fixably connected to deck plate 90. Central axes 55 of each sub-column 55 within a given column 20 are oriented parallel to axis 25 of the given column 20 (and thus, axes 55 are parallel to each of the axes 25). In addition, each sub-column 50 within each column 20 is disposed at the same radial distance from the corresponding axis 25. Within each column 20, upper ends 50a of sub-columns 50 define the upper end 20a of the column 20, and lower ends 50b of sub-columns define the lower end 20b of the column 20.

Each pontoon 30 includes a plurality of laterally adjacent tubular cylindrical sub-pontoons 60. Each sub-pontoon 60 has a central or longitudinal axis 65 oriented parallel to axis 35 of the corresponding pontoon 30, a first end 60a fixably connected to the lower end 50b of one sub-column 50, and a second end 60b fixably connected to the lower end 50b of another sub-column 50. For each pontoon 30, ends 60a of sub-pontoons 60 define ends 30a of pontoon 30, and ends 60b of sub-pontoons 60 define ends 30b of pontoon 30. In this embodiment, each pontoon 30 includes two laterally adjacent sub-pontoons 60, however, other embodiments can employ different numbers of sub-pontoons 60 (e.g., 1, 2, 3, 4, 5, etc.).

Figure 2:
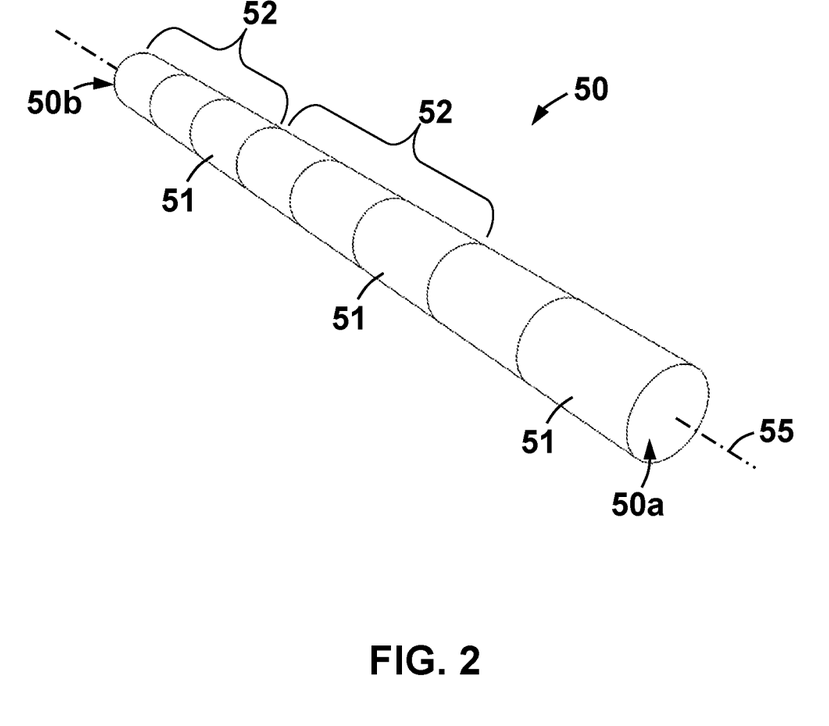
FIG. 2 is an enlarged perspective view of one of the sub-columns of FIG. 1.

Referring now to FIG. 2, one sub-column 50 is shown and will be described with the understanding that other sub-columns 50 are the same. In the embodiment of hull 10 shown in FIG. 1, sub-pontoons 60 are the same as sub-columns 50, and thus, it should be appreciated that the description of sub-column 50 shown in FIG. 2 is also applicable to sub-pontoons 60.

In this embodiment, sub-column 50 includes a plurality of cylindrical cells 52 connected end-to-end, and each cell 52 includes a plurality of discrete shell sections 51 connected end-to-end. Cells 52 and shell sections 51 are coaxially aligned with axis 55. In general, the number of cells 52 used to form sub-column 50 can be varied depending on the desired length and geometry of hull 10.

Figure 3:
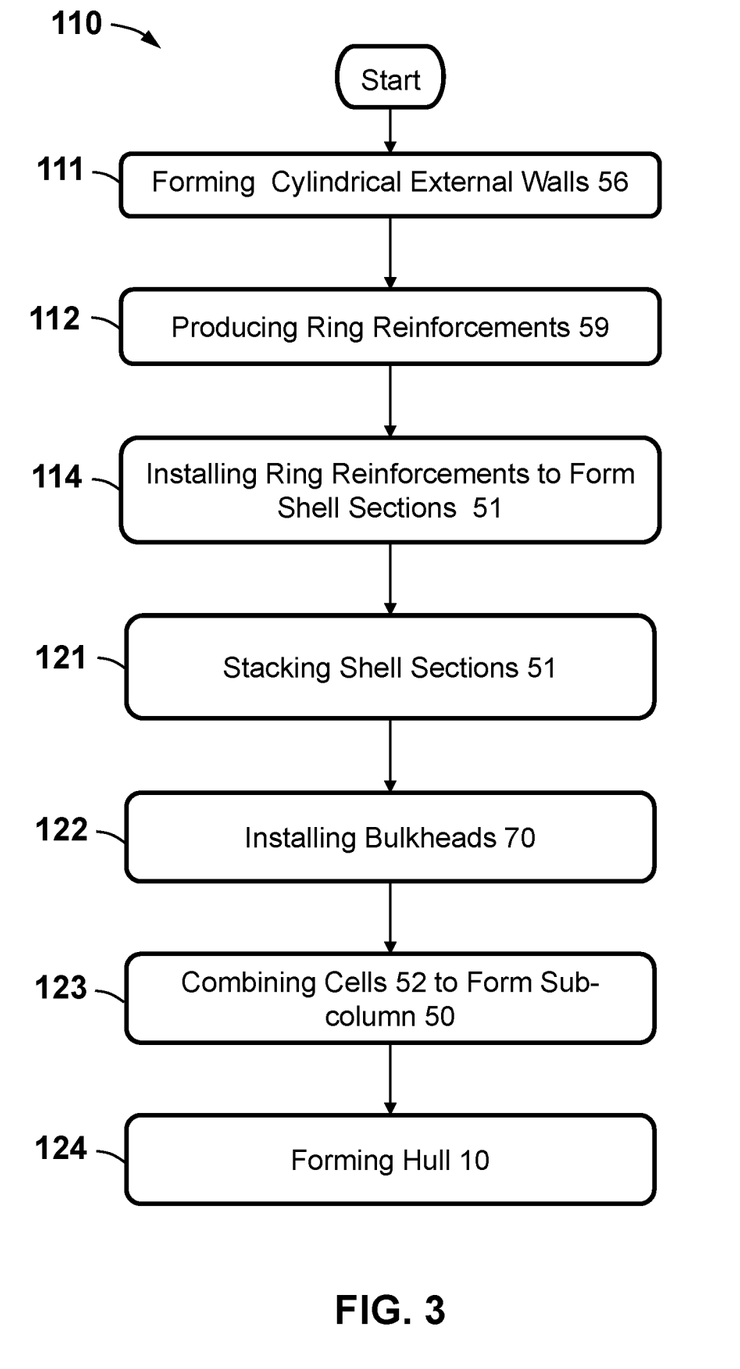
FIG. 3 is a flowchart illustrating an embodiment of a method for constructing the hull of FIG. 1 in accordance with the principles described herein.

Referring now to FIG. 3, an embodiment of a method 110 for constructing the hull 10 of FIG. 1 is shown. As will be described in more detail below, hull 10 is built by constructing a plurality of shell sections 51, using the shell sections 51 to construct a plurality of cells 52, and using a plurality of cells 52 to construct a plurality of sub-columns 50, and then using the sub-columns 50 to construct hull 10. As previously described, sub-pontoons 60 are the same as sub-columns 50, and thus, the method 110 shown in FIG. 3 and described below is also used to construct sub-pontoons 60 and pontoons 30 in a similar manner to that described for sub-columns 50 and columns 20.

In this embodiment, method 110 starts at block 111 where a plurality of cylindrical external walls 56 are formed. Next, a plurality of ring-reinforcements 59 are formed at block 112. The ring reinforcements 59 are installed in the cylindrical external walls 56 in block 114 to form shell sections 51 (see FIG. 2). Thus, blocks 111, 112, 114 together comprise the forming a plurality of shell sections 51. In block 121, the shell sections 51 are stacked and connected end-to-end, and in block 122, bulkheads 70 are installed in the shell sections 51 to form cells 52. Thus, blocks 121, 122 together comprise the forming of cells 52 from shell sections 51. Finally, cells 52 are stacked and connected end-to-end to form sub-columns 50 in block 123, which are used to form hull 10 in block 124. Thus, blocks 123, 124 together comprise the forming of hull 11 from cells 52. Each of the blocks 111-124 will now be described in more detail.

Figure 4:
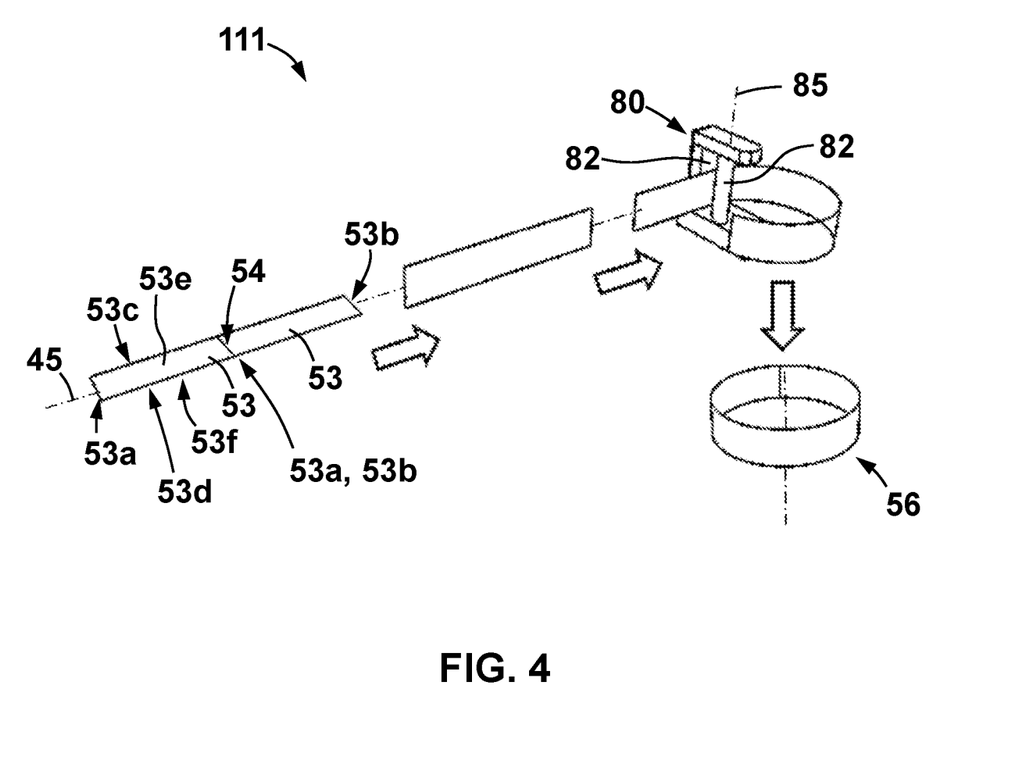
FIG. 4 is a perspective sequential view of a process for forming one of the external walls in accordance with the method of FIG. 3.

Referring now to FIGS. 3 and 4, the cylindrical external wall 56 is formed in block 111 via a vertical rolling operation. In particular, as shown in FIG. 4, a plurality of elongate flat plates 53 are provided. Each plate 53 has a linear (i.e., straight) central or longitudinal axis 45, a first end 53a, a second end 53b, a first lateral edge 53c, a second lateral edge 53d opposite first edge 53c, a first planar side 53e, and a second planar side 53f opposite first planar side 53e. For most offshore subsea applications, each plate 53 has a thickness of 12.7 mm to 50.0 mm, and more preferably 19.1 mm to 38.1 mm (although the thickness of plate 53 may vary outside of these ranges in other embodiments). The plates 53 are axially positioned end-to-end (e.g., first end 53a axially adjacent second end 53b) with the lateral edges 53c, 53d of each plate 53 being aligned and the flat sides of plates 53 being coplanar. Next, the plates 53 are welded together at the adjacent ends 53a, 53b along a weld 54 to form a plate assembly 61. The weld 54 is preferably formed by welding plates 53 at the intersection of ends 53a, 53b on both opposing sides. The plates 53 are sized such that the total length of the welded plate assembly 61 is equal to or substantially equal to the desired circumference of cylindrical external wall 56. Although two plates 53 are shown in this embodiment, in other embodiments, a single plate 53 or more than two plates 53 can be used to form the required perimeter length.

After welding plates 53 together, the plate assembly 61 is placed in a "vertical orientation" such that edges 53c, 53d of each plate 53 are vertically spaced from one another and the opposing sides 53e, 53f of plates 53 extend generally vertically. In this vertical orientation, the plate assembly 61 is fed into the vertical rolling machine 80 with rollers 82 oriented parallel to a vertical axis 85. As plate assembly 61 passes through machine 80, the plate assembly is bent to the desired radius of curvature by engagement with rollers 82. In FIG. 4, plates 53 are shown in a "horizontal orientation" when weld 54 is formed. In other words, when weld 54 is formed, plates 53 are oriented such that edges 53c, 53d of each plate 53 are horizontally spaced from one another and the opposing sides 53e, 53f of plates 53 extend generally horizontally. Once weld is formed, and then the assembled plate assembly 61 is transitioned to the from the horizontal orientation to the vertical orientation, previously described above. However, it should be appreciated that plates 53 can also be welded (e.g., at weld 54) when they are in the vertical orientation, which offers the potential to eliminate the change in orientation of plate assembly 61 step prior to passing the plate assembly through machine 80.

As plate assembly 61 is passed through machine 80 and engages with rollers 82, the flat plate assembly is transitioned into a cylindrical external wall 56, as the distal first end 53a and second end 53b are brought together at a linear seam, which is welded from one or both sides. It is anticipated that the desired, final out-of-roundness tolerances will be met at this point in processing; however, rerolling of the full assembly, or equivalent rework, may be performed to impart curvature near the final weld seam and/or to correct for welding induced heat distortions.

Figure 5A:
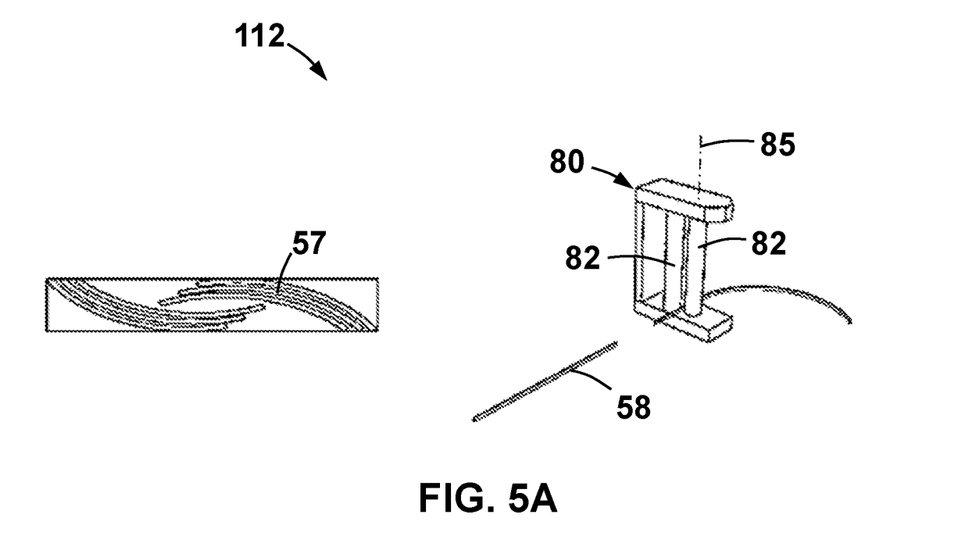
FIG. 5A is a perspective sequential view of one of the processes for producing one of the ring reinforcements in accordance with the method of FIG. 3.
Figure 5B:
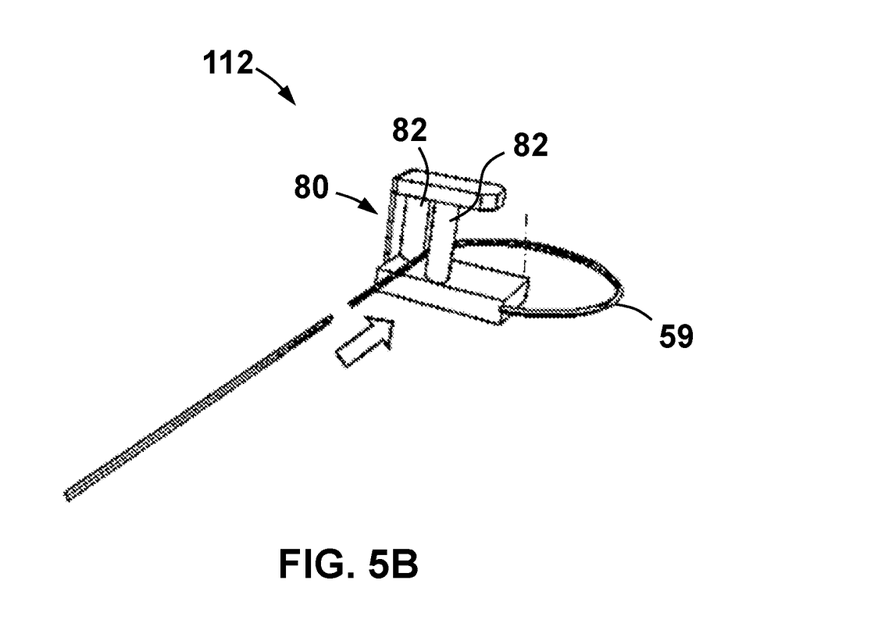
FIG. 5B is a perspective sequential view of another of the processes for producing one of the ring reinforcements in accordance with the method of FIG. 3.

Referring now to FIGS. 3, 5A, and 5B, a plurality of ring reinforcements 59 are formed via block 112 as previously described. FIG. 5A illustrates one method of forming the ring reinforcements of process of block 112, while FIG. 5B illustrates another method of forming ring reinforcements of the process of block 112. It should be appreciated that either or both methods shown in FIGS. 5A, and 5B may be used in the performance of method 110 As will be described in more detail below, ring reinforcements 59 are constructed and subsequently installed in the cylindrical external walls 56 to form shell sections 51 at process block 114.

Figure 6:
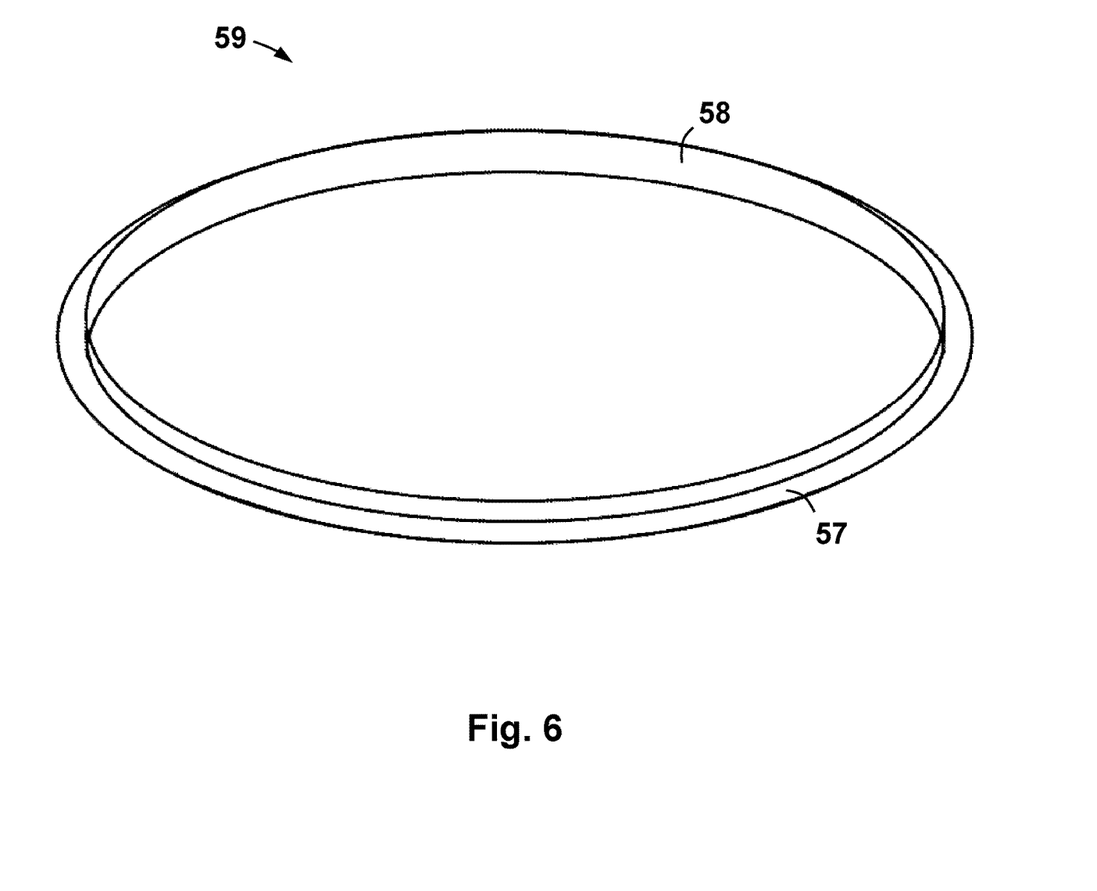
FIG. 6 is a perspective view of one of the ring reinforcements formed by one or both of the processes of FIGS. 5A and 5B.

In this embodiment, the ring reinforcements 59 are annular structures having a T-shaped cross-section. In particular, referring briefly to FIG. 6, each ring reinforcement 59 includes a radially inner vertically oriented cylindrical flange 58 and a radially outer horizontally oriented annular web 57 extending radially from the cylindrical flange 58. The outer radius of ring reinforcements 59 (e.g., the outer radius of annular web 57) is substantially the same as the inner radius of the cylindrical external wall 56 within which they are installed.

As best shown in FIG. 5A (with continuing reference to FIGS. 4 and 6 also), in one embodiment of block 112, the annular flange 58 and the web 57 of each ring reinforcement 59 are separately formed and then welded together. In particular, circumferential segments of the webs 57 are cut from a flat plate with a curved profile, and the flanges 58 are bent using vertical rolling machine 80 (which shown as the same machine 80 used to bend plate assemblies 61 previously described, but can be a different bending machine in other embodiments). The flanges 58 are bent into a substantially annular shape via engagement with rollers 82 on machine 80, and the webs 57 are welded to the outside of the flanges 58 to form ring reinforcements 59.

As best shown in FIG. 5B, in another embodiment of block 112, a pre-formed or extruded linear T-beam (having portions that will form both the flange 58 and web 57 as previously described) is bent with the vertical rolling machine 80 (which again is shown may be a different rolling machine than that used to bend plate assemblies 61 in other embodiments) into a substantially annular shape.

Regardless of whether the method of FIG. 5A or the method of FIG. 5B is used to form ring reinforcements 59, the resulting ring reinforcement 59 are produced such that the free ends of the T-beam meet end-to-end to form a complete circle.

Figure 7:
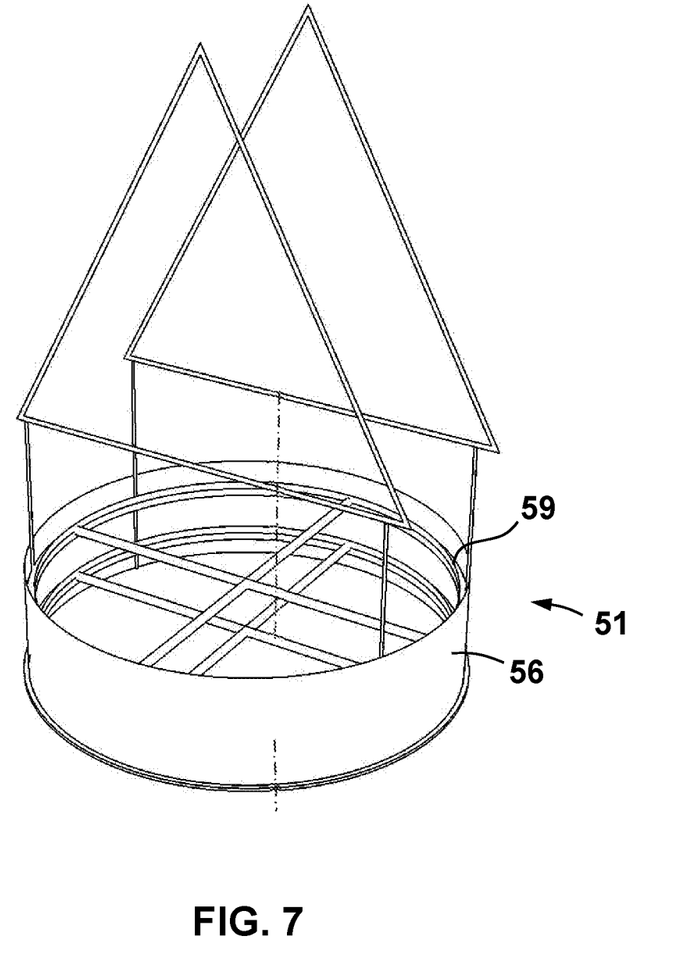
FIG. 7 is a perspective view of one shell section of FIG. 2 made in accordance with the method of FIG. 3.

Referring now to FIGS. 3 and 7, in block 114, a plurality of ring reinforcements 59 (which may be formed by the method of FIG. 5A and/or FIG. 5B in block 112) are positioned inside each cylindrical external wall 56, axially spaced apart, and welded to the corresponding external wall 56 to form shell sections 51. In particular, the annular web 57 of each reinforcement 59 is welded to the radially innermost surface of the external wall 56 to secure reinforcements 59 therein.

Figure 8:
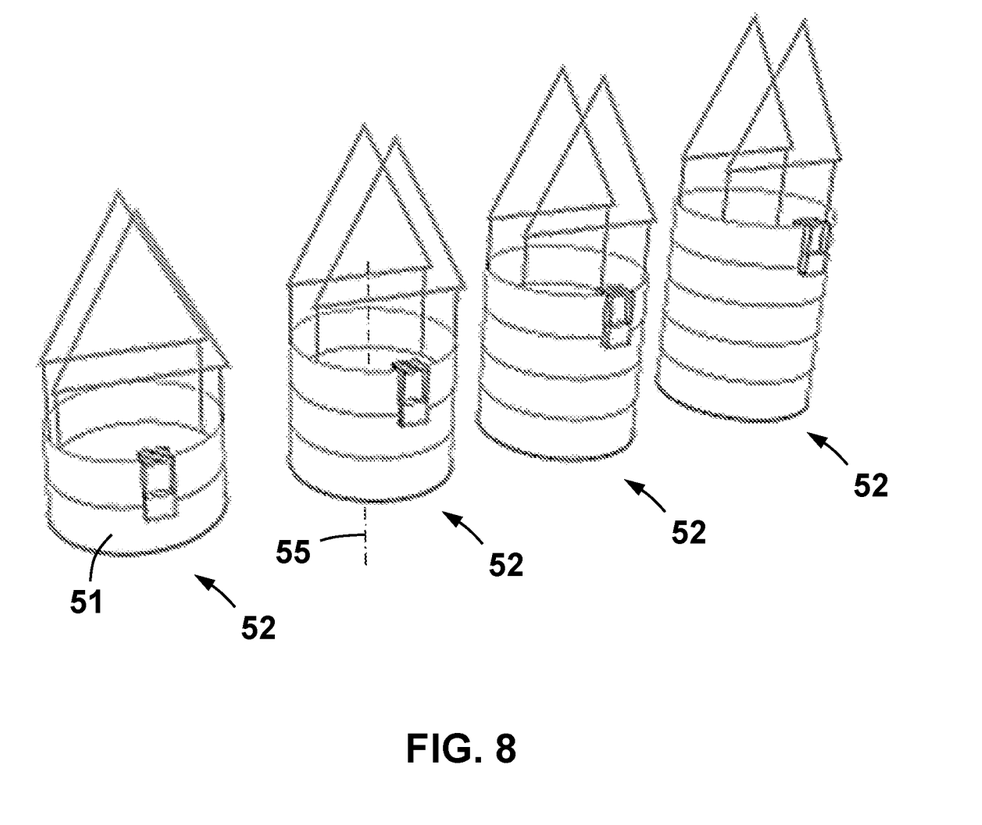
FIG. 8 is a perspective sequential view of the process for stacking and welding shell sections to form one tank in accordance with the method of FIG. 3.

Referring now to FIGS. 3 and 8, in block 121, a plurality of shell sections 51, made as previously described, are stacked end-to-end, coaxially aligned (along axis 55), and welded together to form cylindrical cells 52. The number of shell sections 51 used to form cell 52 may be varied based on the desired height or length of the cell 52.

Figure 9:
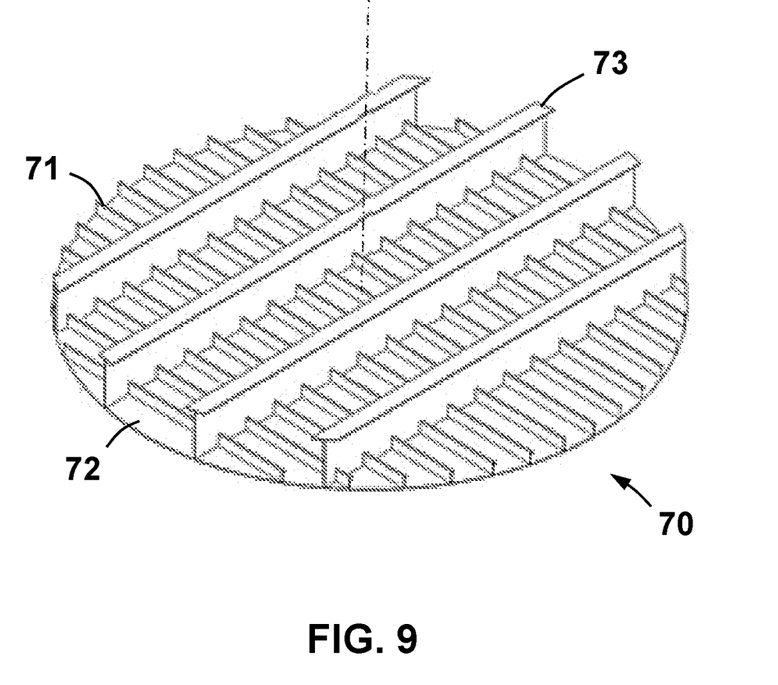
FIG. 9 is a perspective view of one of the bulkheads used to form tanks in accordance with the method of FIG. 3.

Moving Referring now to FIGS. 3 and 9, a plurality of bulkheads 70 are fabricated using conventional welding and construction techniques. In this embodiment, each bulkhead 70 includes a flat circular steel plate 72, a plurality of parallel elongate stiffeners 71 fixably attached to plate 72, and a plurality of parallel elongate T-beam reinforcements 73 fixably attached to plate 72. Stiffeners 71 and T-beam reinforcements 73 are oriented perpendicular to each other. In the embodiment shown in FIG. 8, stiffeners 71 have an L-shaped cross-section and T-beam reinforcements 73 have a T-shaped cross-section. However, in other embodiments, the stiffeners (e.g., stiffeners 71) can have a bulb-shaped cross-section or rectangular cross-section. Stiffeners 71 and T-beam reinforcements 73 73 are welded onto the same side of plate 72 to form each bulkhead 70. In block 122 of FIG. 3, bulkheads 70 are welded to the open ends of cell 52 such that cells 52 define an isolated internal volume that can be adjustably ballasted, filled with air, etc.

Figure 10A:
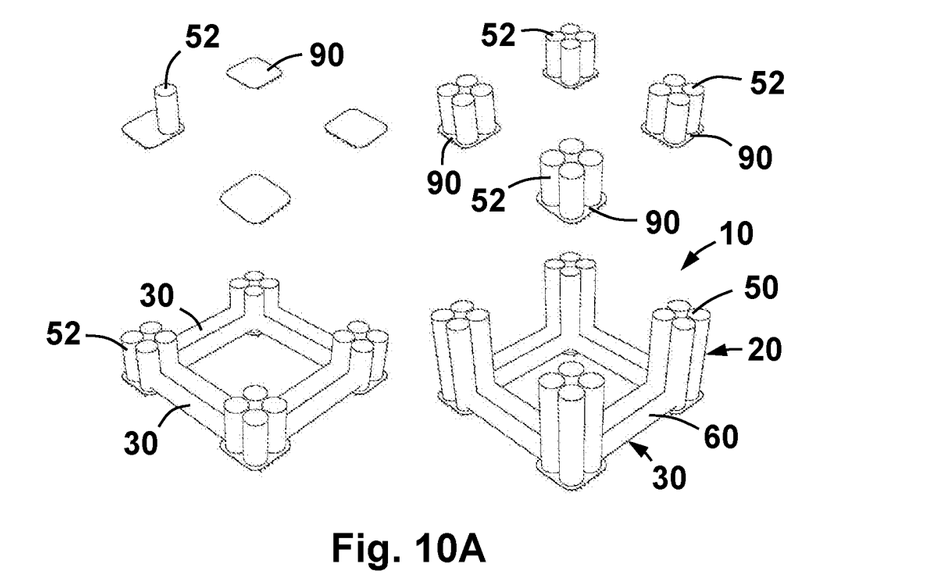
FIG. 10A is a perspective sequential view of the process for combining the cells to form sub-columns and forming the hull in accordance with the method of FIG. 3.

Referring now to FIGS. 3 and 10A, a plurality of cells 52 are stacked end-to-end atop decks 90, coaxially aligned, and welded together to form sub-columns 50. The lowermost cell 52 in each sub-column 50 seated on a deck 90 is fixably attached to the deck 90 via welding. A plurality of sub-columns 50 are formed on each deck 90 to form columns 20. Sub-pontoons 60 can be made in the same manner as sub-columns 50, connected together to form pontoons 30, and connected to lower ends 20b of columns 20 to form hull 10.

Figure 10B:
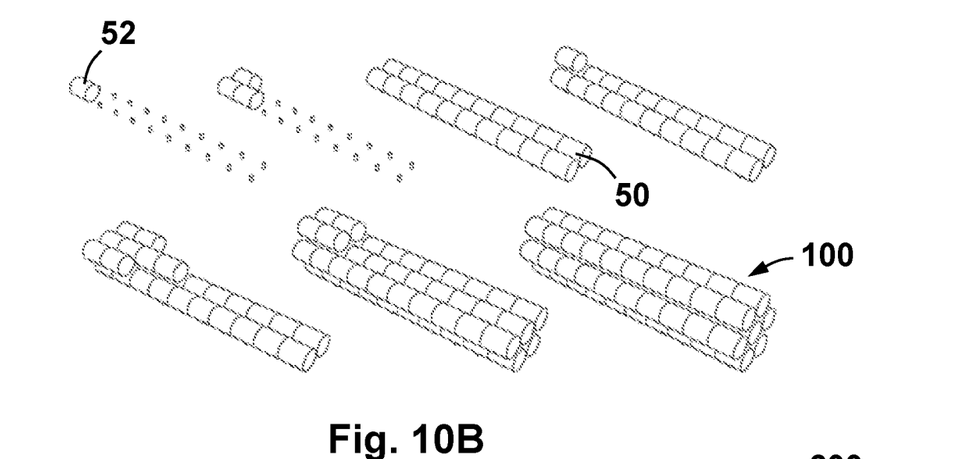
FIG. 10B is a perspective sequential view of an embodiment of a method for combining cells to form a plurality of the sub-columns of FIG. 2 and using the sub-columns to construct a hull of a spar or buoyant tower platform.
Figure 10C:
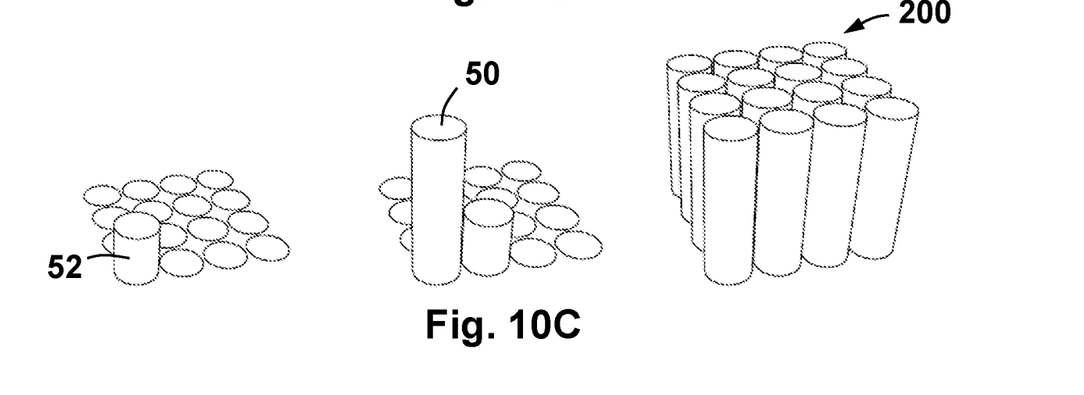
FIG. 10C is a perspective sequential view of an embodiment of a method for combining cells to form a plurality of the sub-columns of FIG. 2 and using the sub-columns to construct a cellular bottom-founded offshore structure.

In the embodiment shown in FIG. 10A, cells 52 are used to construct sub-columns 50 and sub-pontoons 60, which are used to build hull 10 for a floating semi-submersible platform. However, in other embodiments, cells 52 can be used to form other types of offshore structures. For example, in FIG. 10B, a plurality of cells 52 are stacked end-to-end, coaxially aligned, and fixably attached to form a plurality of parallel sub-columns 50 used to construct a hull 100 for a floating spar or a bottom founded buoyant tower platform; and in FIG. 10C, a plurality of cells 52 are stacked end-to-end, coaxially aligned, and fixably attached to form a plurality of parallel sub-columns 50 used to construct a bottom-founded tower 200.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method for constructing a hull of an offshore structure, the method comprising:
   (a) welding a plurality of plates together to form a plate assembly;
   (b) vertically orienting the plate assembly and then passing the plate assembly through a rolling machine with the plate assembly in the vertical orientation;
   (c) bending the plate assembly about a vertical axis and into a cylinder during (b), wherein the cylinder includes a pair of circumferentially adjacent free ends;
   (d) welding the free ends of the cylinder together after (c) to form a cylindrical external wall.

2. The method of claim 1, wherein each of the plates has a first planar side and a second planar side opposite the first planar side,
   wherein the first planar side and the second planar side extend substantially horizontally during (a), and
   wherein the first planar side and the second planar side extend substantially vertically during (b) and (c).

3. The method of claim 2, wherein each of the plates wherein the first planar sides of the plates are co-planar during (a) and the second planar sides of the plates are co-planar during (a) also has a first end, and a second end opposite the first end, and
   wherein (a) further comprises welding a first end of one of the plurality of plates to a second end of another of the plurality of plates.

4. The method of claim 1, further comprising:
   (e) attaching a plurality of ring reinforcements to an inner surface of the cylindrical external wall to form a shell section.

5. The method of claim 4, wherein each of the plurality of ring reinforcements comprises:
   an annular web; and
   a flange welded to the annular web.

6. The method of claim 5, wherein the annular web and the flange define a T-shaped cross-section for each of the plurality of ring reinforcements.

7. The method of claim 5, further comprising:
   (f) repeating (a) (e) to form a plurality of shell sections; and
   (g) stacking the plurality of shell sections to form a cell.

8. The method of claim 7, further comprising:
   (h) attaching a first bulkhead to the cell.

9. The method of claim 8, further comprising:
   (i) repeating steps (a)-(h) to form a plurality of cells; and
   (j) forming a hull with the plurality of cells.

10. The method of claim 8, further comprising:
    (i) attaching a second bulkhead to the cell.

11. A method for constructing a hull of an offshore structure, the method comprising:
    (a) passing a plate through a rolling machine, wherein the plate comprises a pair of opposing planar sides and wherein the plate is passed through the rolling machine in a vertical orientation such that the opposing planar sides extend substantially vertically;
    (b) engaging the plate with a plurality of rollers in the rolling machine wherein each of the plurality of rollers extend in a vertical direction;
    (c) bending the plate into a cylinder during (b), wherein the cylinder includes a pair of circumferentially adjacent free ends;
    (d) welding the free ends of the cylinder together after (c) to form a cylindrical external wall; and
    (e) attaching a plurality of ring reinforcements to an inner surface of the cylindrical external wall to form a shell section.

12. The method of claim 11, wherein each of the plurality of ring reinforcements comprises a radially inner flange and a radially outer annular web, and wherein (e) comprises securing the annular web of each of the plurality of ring reinforcements to the inner surface of the cylindrical external wall.

13. The method of claim 12, further comprising:
    forming one or more of the plurality of ring reinforcements by bending a plurality of T-beams into a plurality of rings having circumferentially adjacent ends; and
    (g) securing the ends of the plurality of rings to one another to form the plurality of ring reinforcements.

14. The method of claim 12, further comprising:
    (h) forming one or more of the plurality of ring reinforcements by:
       (h1) cutting the annular web from a flat plate;
       (h2) bending the flange into a circular shape; and
       (h3) securing the annular web to the flange.

15. The method of claim 11, further comprising:
    (f) repeating (a) (e) to form a plurality of shell sections; and
    (g) stacking the plurality of shell sections to form a cell.

16. The method of claim 15, further comprising:
    (h) attaching a first bulkhead to the cell.

17. The method of claim 16, further comprising:
    (i) attaching a second bulkhead to the cell.

18. A method for constructing a hull of an offshore structure, the method comprising:
    (a) passing a plate through a rolling machine, wherein the plate comprises a pair of opposing planar sides and wherein the plate is passed through the rolling machine in a vertical orientation such that the opposing planar sides extend substantially vertically;
    (b) engaging the plate with a plurality of rollers during in the rolling machine during (a) wherein each of the plurality of rollers extend in a vertical direction;
    (c) bending the plate into a cylinder during (b), wherein the cylinder includes a pair of circumferentially adjacent free ends;
    (d) welding the free ends of the cylinder together after (c) to form a cylindrical external wall;
    (e) attaching a plurality of ring reinforcements, each including a radially inner flange and a radially outer annular web, to an inner surface of the cylindrical external wall to form a shell section after (d) by welding the annular web of each of the plurality of ring reinforcements to the inner surface of the cylindrical wall;
    (f) repeating (a)-(e) to form a plurality of shell sections;
    (g) stacking the plurality of shell sections to form a cell after (f);
    (h) attaching a first bulkhead to the cell after (g);
    (i) repeating steps (a)-(h) to form a plurality of cells; and
    (j) forming a hull with the plurality of cells after (j).

19. The method of claim 18, further comprising:
    (k) forming one or more of the plurality of ring reinforcements by bending a plurality of T-beams into a plurality of rings having circumferentially adjacent ends; and
    (l) securing the ends of the plurality of rings to one another to form the plurality of ring reinforcements.

20. The method of claim 18, further comprising:
    (m) forming one or more of the plurality of ring reinforcements by:
       (m1) cutting the annular web from a flat plate;
       (m2) bending the flange into a circular shape; and
       (m3) securing the annular web to the flange.

* * * * *